INVENTOR
DENNIS JAMES MYNALL

ATTORNEY

Sept. 10, 1963  D. J. MYNALL  3,103,614

PROGRAMMED MACHINE TOOL CONTROL SYSTEMS

Filed Oct. 21, 1960  7 Sheets-Sheet 2

INVENTOR
DENNIS JAMES MYNALL
ATTORNEY

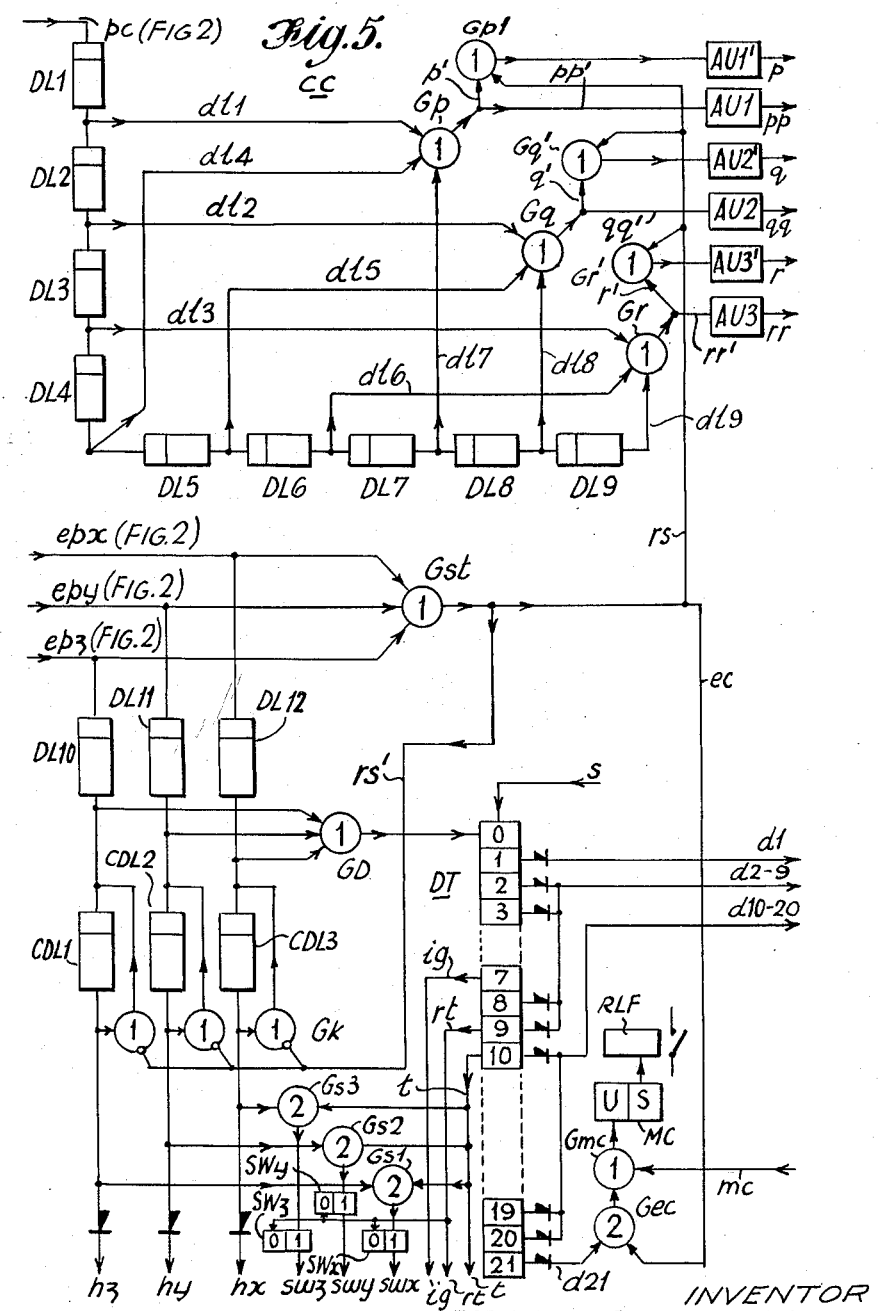

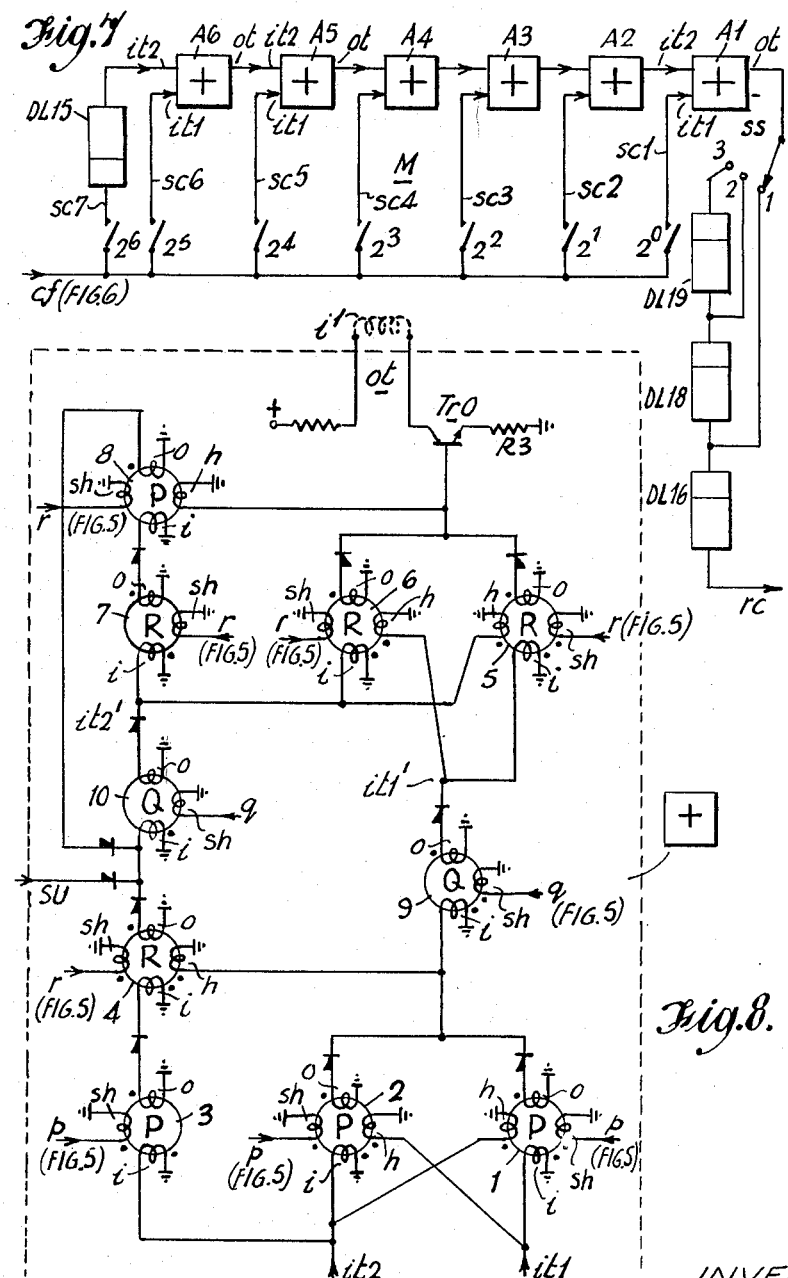

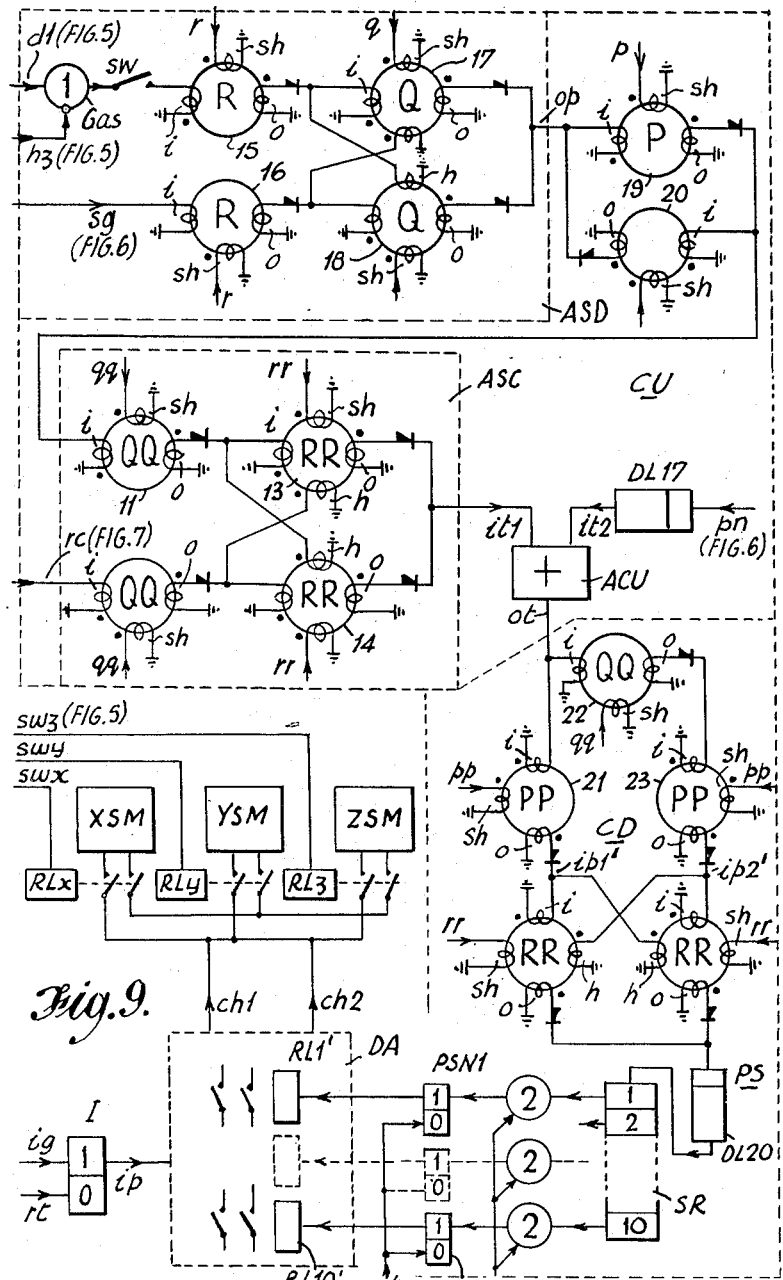

United States Patent Office 3,103,614
Patented Sept. 10, 1963

---

3,103,614
PROGRAMMED MACHINE TOOL CONTROL SYSTEMS
Dennis James Mynall, Rugby, England, assignor to Associated Electrical Industries Limited, London, England, a British company
Filed Oct. 21, 1960, Ser. No. 64,077
Claims priority, application Great Britain Oct. 23, 1959
12 Claims. (Cl. 318—162)

This invention relates to programmed machine tool control systems and in particular to such systems in which the movements between a workpiece and a cutting tool, for instance a milling cutter, along two or three usually mutually perpendicular directions are continuously and contemporaneously controlled in a co-ordinated manner from positional data recorded digitally on a magnetic tape or other suitable recording medium, the movements being so co-ordinated as to result in the tool reproducing a predetermined shape on the workpiece.

According to the present invention, the recorded data relating to each direction of controlled movement consists of a sequence of binary numbers which represent on a given scale with reference to some arbitrary zero position, a succession of instantaneous positions closely spaced along the relevant direction of movement. The sequences of positional numbers relating to the two or three different directions of controlled movement are recorded in an interlaced manner (namely so that positional numbers respectively relating to the different directions occur, as recorded, in a repeated cyclic order), and the digits constituting each such number are themselves preferably recorded as one or more digit groups in each of which the constituent digits are recorded in parallel mode on respective tracks corresponding in number to the number of digits per group. Preferably each digit group comprises two or three digits so that the number of recording tracks required is no greater than that required in certain prior systems in which each of two or three directions of controlled movement is served by an individual track containing data defining, for instance, the frequency of successive incremental movements along the direction concerned.

In controlling the movements of a machine tool by positional data recorded in the manner of the present invention, the positional members are continuously and successively read from the recording medium and after suitable processing are fed to servo-mechanisms, one for each direction of controlled movement, each of which, also fed with information as to the actual instantaneous positions of the tool relative to a workpiece along the direction to which it relates, acts so as always to adjust the actual position towards the next required posiiton as called for by the recorded positional numbers relating to that direction.

An advantage arising from the interlaced recording of the positional numbers relating to the different directions of controlled movement, is that these numbers can be processed in a single channel, in what is effectively time division multiplex, up to the stage at which they are required separately at respective servo-mechanisms by which the movements along these directions are controlled. This is to be compared with the known systems in which the programme information relative to the several directions is recorded on separate tracks and has therefore to be processed in separate channels, which consequent multiplication of the processing circuits required.

By the combined parallel-serial mode of recording preferably employed, other advantages are obtained. For instance it becomes possible in accordance with an important subsidiary feature of the invention, to record along with each digit group, on an additional track, a "parity" digit which brings each group to an odd or even parity: that is, the number of "1" digits in each group, including its parity digit, is made either an even number in all groups or an odd number in all groups. By then providing an arrangement which provides an output pulse in response only to the reading of a digit group having the appropriate parity, a series of pulses can be obtained which can be used as timing or "clock" pulses defining successive digit group periods corresponding to those in which the successive digit groups are read. These clock pulses can be used for initiating certain actions which may be required to take place within the relevant digit group period, such for instance as the serialisation of the digits constituting the corresponding digit group. By giving each digit group a particular parity as indicated, it is also possible to insert additional digit groups which, by reason of having the opposite parity, can be detected and utilised for purposes such as synchronisation.

In the accompanying drawings a programmed machine tool control system embodying the invention and incorporating certain other subsidiary features is illustrated by way of example. In these drawings:

FIG. 5 illustrates the contents of a central control circuit;

FIG. 7 illustrates a digit multiplier;

FIG. 8 illustrates a form of arithmetic adder;

FIG. 9 illustrates an arithmetic combining unit and a position store circuit, together with the relationship of the latter to a digital-analogue converter feeding position responsive servo-mechanisms for controlling the movement of a machine tool.

The form and contents of the recorded information will be considered first, followed by a description of the manner in which the information as read from the recording medium can be processed and utilised.

It will be assumed that a contour milling machine is to be controlled in its relative movements along three mutually perpendicular directions which for convenience will be referred to as the X, Y and Z directions, the Z direction being parallel to the axis of the milling cutter. The movements along these three directions are controlled from respective co-ordinated positional programmes each constituted by a sequence of positional binary numbers recorded digitally and computed according to the shape which the cutter is required to cut on a workpiece. The programmes are assumed to be computed with reference to the required relative movements of the centre of a cutter of nominal radius with respect to the workpiece, so that in consequence, as is known, it is desirable to afford the facility of introducing a positional correction to allow for possible difference between the nominal cutter radius for which the programmes were computed and the actual radius of a cutter that is being used. The correction is required in a direction normal to the instantaneous cutting direction determined by the compounded relative movements along the X and Y directions. Accordingly this correction has to be resolved into two components along these directions as sine and cosine functions of the angle between one of these directions and the instantaneous cutting direction. For each of the X and Y directions, therefore, a correction component is required equal to the radius difference multiplied by a correction factor which varies with the instantontous cutting direction between unity when the cutting direction is perpendicular to the particular X or Y direction concerned, and zero when the cutting direction is parallel to that particular direction. These correction factors, and also the sense of the corrections can be computed either directly from a knowledge of the cutting direction which is required at any instant depending on the shape to be cut, or possibly more easily, from information available at an intermediate stage in the computation of the recorded X and Y positional numbers, that is, those relating to the X and Y directions.

For the purposes of the invention the sequences of X, Y and Z positional numbers are interlaced on the recording medium—which will be assumed hereinafter to be a magnetic tape—and each X and Y positional number is immediately preceded by an appropriate correcting factor which is recorded digitally as a binary number immediately preceded by a sign digit which has no numerical significance but signifies, according to its value (0 or 1), the sense in which the correction is required.

Figure 1:
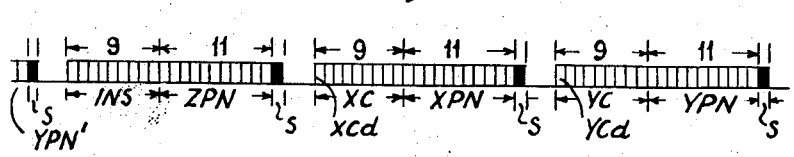
FIG. 1 illustrates in serial mode the contents of the digital information recorded for the purposes of the invention.

A serial representation of this order of recording is given in FIG. 1, in which XPN, YPN and ZPN relate to positional numbers respectively belonging to the sequences of such numbers relating to the X, Y and Z directions, XC and YC relate to the correction factors for the X and Y positional numbers to which XPN and YPN respectively relate, and $XC_d$ and $YC_d$ (included in XC and YC) relate to the sign digits for the correcting factors. It will be noted that the positional numbers occur, in the direction of the arrow, in a repeated order ZPN, XPN, YPN, that XPN and YPN are respectively preceded by XC and YC, and that $XC_d$ and $YC_d$ appear at the beginning of XC and YC. The significance of INS and S will appear later. Each of the small rectangles in FIG. 1 represents a binary digit space which may contain a binary "1" or a binary "0" as required.

As regards the positional numbers such as XPN, YPN, ZPN, relating to any particular one of the X, Y and Z directions, these represent in binary notation, to a given scale, successive positions along the direction concerned from an arbitrary zero position. If the unit of length is taken to be 1/10000 inch, that is, 0.1 thou. (1 thou.=1 thousandth of an inch), and if for each of the successive positions only the binary digits having a significance between $2^9$ and $2^{-1}$ (inclusive) are recorded, then positional numbers each of 11 binary digits are required and positions which are multiples of $2^{10} \times 1/10000$ inch (0.1024 inch) apart have identical position numbers. This does not matter, because by ensuring that the distance between two successive positions is never more than, say, 1/8 of 0.1024 inch, a servo-mechanism which finally controls the movement in the direction concerned can resolve the apparent ambiguity by always approaching the nearest of the multiplicity of indicated positions. This limitation of the range within which a position is defined minimises the digit storage capacity required on the recording tape for a given resolution but loses none of the relevant advantages of a system having completely unambiguous position definition.

Using 11-digit positional numbers as aforesaid, and assuming that, as will be described hereafter, provision is made for correcting for cutter radius differences of up to 9.5 thou. from nominal in steps of 0.1 thou., correction numbers of 8 binary digits plus the sign digit, the most significant digit representing unity, are adequate.

Accordingly in FIG. 1 XPN, YPN and ZPN, relating to positional numbers, are shown as including 11 digit periods each, while XC and YC, relating to correction numbers and their sign digits, are shown as including $8+1=9$ digit periods each.

There may also be recorded on the tape sets of instruction digits, which can be used for controlling auxiliary functions such for instance as stopping the tape, clamping the machine against movement along a particular direction, turning on coolant and so on. As indicated, at INS in FIG. 1, it is convenient for each set of instruction digits to comprise nine digits (requiring the same number of digit spaces as does each correction number with its sign digit) and for the sets of instruction digits to be recorded immediately before the Z position numbers, seeing that the latter have no correction numbers before them. It is also convenient to have the instructions first, which explains why the Z position number ZPN has been taken first in order, that is, before XPN and YPN.

Figure 2:
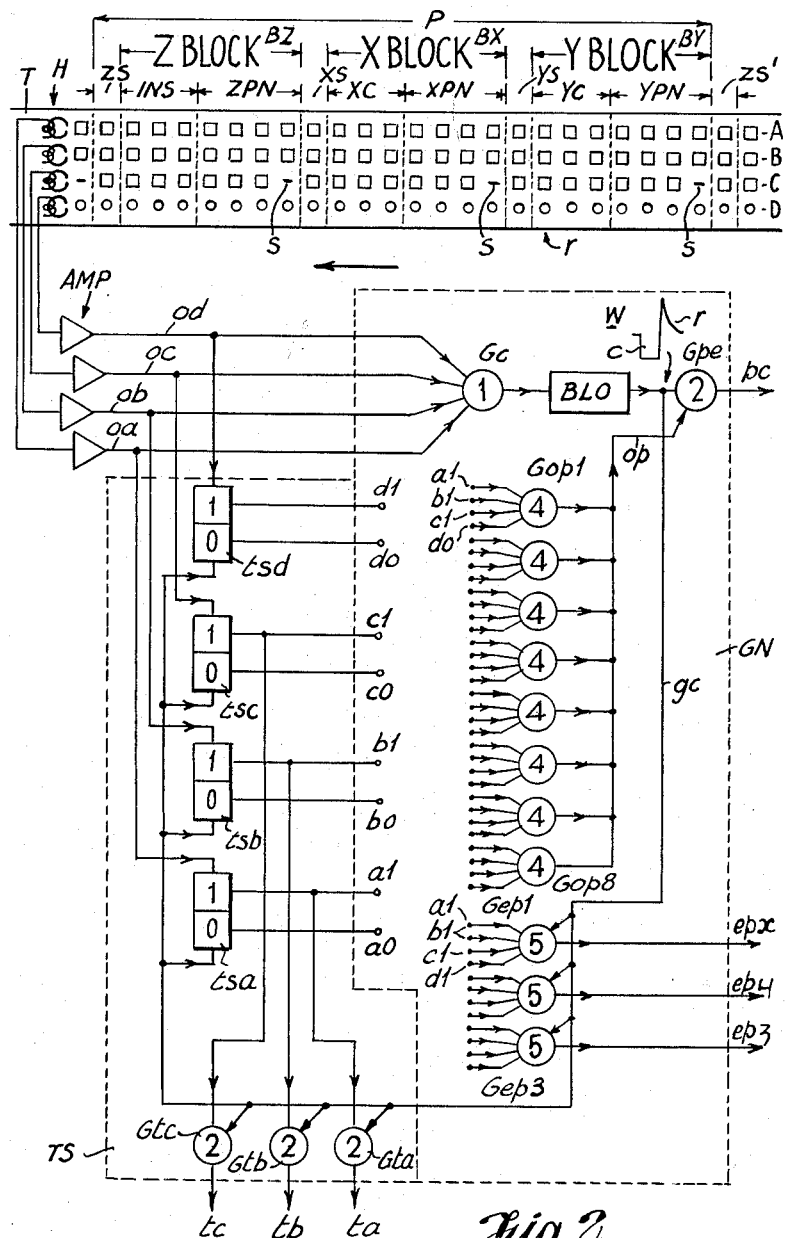
FIG. 2 illustrates the serial-parallel mode of recording the digital information on a recording tape and also illustrates, in so-called "logical" representation, a temporary storage arrangement and a start signal and clock pulse generator forming part of the data processing equipment.

Turning now to FIG. 2, there is represented at T at the top of this figure part of a magnetic recording tape having four recording tracks A, B, C, D each read by an individual reading element of a multiple reading head H. The horizontal arrow in this case indicates the direction of movement of the tape T past the reading head H, so that the tape is read from left to right correspondingly to the arrow in FIG. 1. For the serial-parallel mode of recording already referred to, each set of digits INS, ZPN, XC, XPN, YC, YPN has its digits grouped in threes, starting with the least significant digit, and these groups are recorded serially with respect to each other, least significant group first. The three digits of each group are separately recorded in parallel on three tracks A, B and C of the recording tape T: for instance of the nine instruction digits in a set, the first (least significant), fourth and seventh are recorded in that order in track A, the second, fifth and eighth are recorded in track B, and the third, sixth and ninth in track C. This is represented in FIG. 2, in which the digit spaces for the data digits, that is, the instruction, positional and correction digits, are represented by small rectangles on the tape T. The digit spaces lying in each row such as $r$ transverse to the tape T contain the digits of a single group. The order of recording according to FIG. 1 is retained, so that there is recorded on the tape a succession of "packets" of information, such as P, each of which comprises, in order, a set of three groups of instruction digits INS, a set of four groups of digits constituting a Z positional number ZPN, a set of three groups of digits constituting an X correction number XC with its sign digit $XC_d$, a set of four groups of digits constituting an X positional number XPN, a set of three groups of digits constituting a Y correction number YC with its sign digit $YC_d$, and a set of four groups of digits constituting a Y positional number YPN. Since there are only 11 digits in each positional number, the last digit in the fourth group pertaining to such number is always a "0." The digit place for this last digit is marked S in FIG. 2 and a corresponding place is likewise marked in FIG. 1.

On the fourth track D on the recording tape, in digit spaces represented by the small circles, parity digits are recorded in parallel with the several digit groups in order to bring the digits in each transverse row such as $r$ to an odd parity: that is, each digit group plus its parity digit contains an odd number of "1" digits.

Immediately preceding the set of instruction digits INS in each packet of information such as P, there is also recorded a digit group ZS of even parity which can be used for synchronization and other purposes. For similar purposes an even parity group XS, YS may be, and for the present description is assumed to be recorded immediately preceding each of the correction numbers XC and YC. These even parity groups will be called start groups, to distinguish them verbally from the odd parity data groups. Each packet of information therefore comprises twenty-four digit groups which can be considered as constituting three blocks of data BZ, BX, BY, each comprising seven data groups preceded by a start group. The first block BZ, which comprises the instruction digits INS and the Z positional number ZPN, will for convenience be called the Z block, although it will be appreciated that the instruction digits are not functionally associated with the Z direction of movement any more closely than with the X and Y directions. The other two blocks BX and BY each comprising a correction number and positional number will be called the X and Y blocks respectively.

Turning now to the data processing equipment, the tape T runs at constant speed past the multiple reading head H, which reads in parallel the digits constituting each successive group (including the associated parity digit) and produces on four separate output leads $oa$, $ob$, $oc$, $od$, after any necessary amplification and shaping in shaping amplifiers AMP, pulse sequences which correspond to the digital information on the four tracks, A, B, C, D: a pulse is produced on the relevant output lead when and only when a "1" digit is read on any track.

Figure 3:
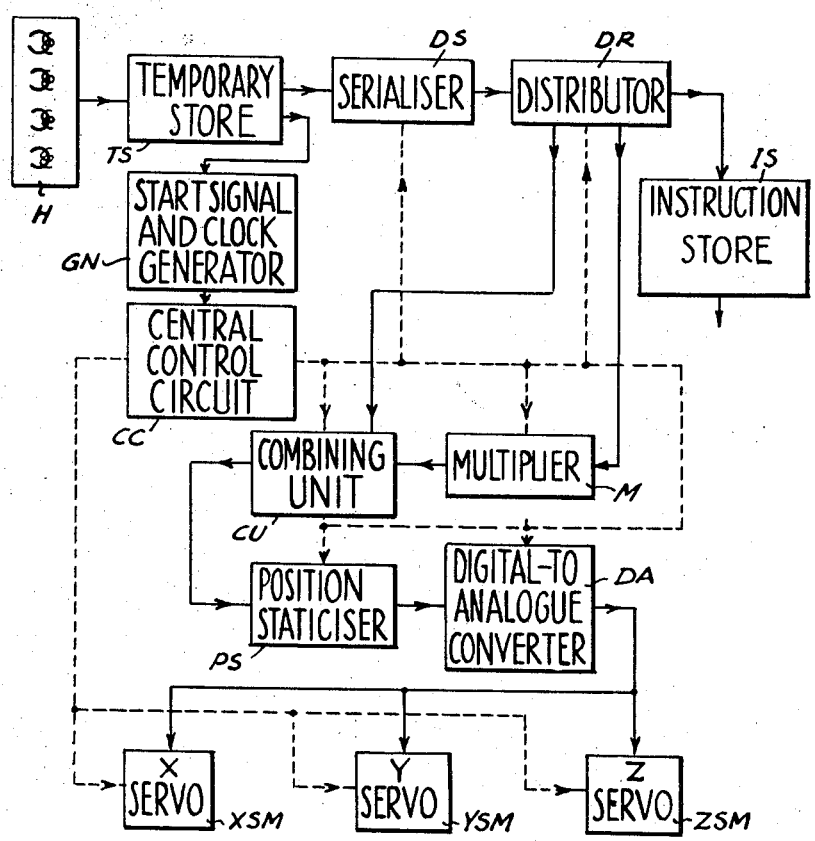
FIG. 3 is a block schematic representation of the general organisation of the data processing equipment.

The outputs from multiple reading head H on leads $oa$, $ob$, $oc$, $od$ are fed to data processing equipment the general organization of which is represented in block form in FIG. 3. As shown in this figure, the data processing equipment comprises a temporary store TS fed from the multiple reading head H, a start signal and clock pulse generator GN, a central control circuit CC, a digit serialiser DS, a distributor DR, an instruction digit staticiser and store IS, a multiplier M, a combining unit CU, a position staticiser PS, and a digital-to-analogue converter DA the output of which is fed to servo-mechanisms XSM, YSM, ZSM which control the feed of the machine tool in the X, Y and Z directions respectively.

These components of the processing equipment will now be considered seriatim.

Temporary Store (FIG. 2)

Due to the mechanical tolerances which must be allowed for, the pulses provided by the reading head H from the "1" digits in a single digit group may be presented at slightly different times on the output leads $oa$ . . . $od$ from the reading head. They are therefore temporarily stored so that all the digits of a group can be examined simultaneously. For this purpose the temporary store TS comprises four bistable storage elements $tsa$ . . . $tsd$ connected to the reading head output leads and constituted for instance by bistable transistor circuits. Each of these storage elements becomes set to one of its stable states in response to a pulse on the relevant output lead and is otherwise left unset in its other stable state. In other words the storage elements are set in response to "1" digits but are left unset by "0" digits. Each of the storage elements has two output terminals $a1$—$a0$, $b1$—$b0$, $c1$—$c0$, $d1$—$d0$ and applies a marking potential to one or other of these two terminals according as the storage element is set (terminal —1) or unset (terminal —0).

Start Signal and Clock Pulse Generator GN (FIG. 2)

The four storage elements $tsa$ . . . $tsd$ provide at their output terminals just mentioned, parallel inputs to a logical circuit which has four distinct output connections $pc$, $epx$, $epy$, $epz$ over one of which ($pc$) a clock signal is passed to the central control circuit CC if the parallel inputs have an odd parity, that is, if they are derived from a data group read from the tape, whereas over one of the other of these output connections a start signal is passed to the central control circuit CC if the parallel inputs, obtained from a start group, have an even parity. This logical circuit may take various forms capable of fulfilling the required functions: one form is represented in FIG. 2 within the block GN. Referring again to FIG. 2 the output leads $oa$ . . . $od$, in addition to being connected to the temporary stores $tsa$ . . . $tsd$, are taken as input connections to a single-coincidence ("OR") gate Gc which passes an initiating pulse to a blocking oscillator BLO in response to the occurrence of a pulse on any one of the leads $oa$ . . . $od$. As a pulse appears on at least one of these leads for each digit group read by the reading head H (since each group, with its parity digit, contains at least one "1" digit), the blocking oscillator will be initiated into operation in response to the reading of each digit group. The blocking oscillator BLO, which may itself take various forms, is designed to produce, in response to each initiating pulse, an output waveform such as that indicated at W comprising a generally rectangular pulse $c$ of one polarity followed by a pulse $r$ of opposite polarity, it being arranged that, in the event of there being more than one "1" digit in a digit group, the pulse $c$ is initiated by the trailing edge of the last pulse on the leads $oa$ . . . $od$ (recalling that the pulses on the leads may not be exactly coincident): this can be achieved by initiating action of the blocking oscillator BLO by the pulses derived by differentiation of the trailing edge of the output from gate Gc. In this way it is ensured that the waveform W which is used for timing and resetting purposes will not occur until all these stores have had time to become set if required to do so.

Figure 4:
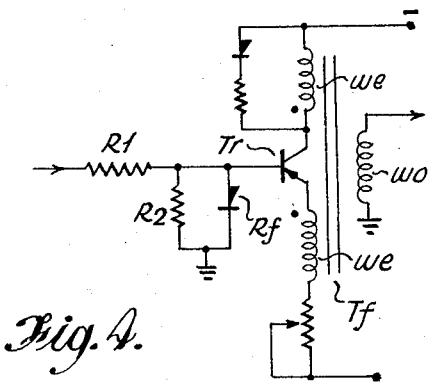
FIG. 4 illustrates a suitable form of circuit for a blocking oscillator in the clock pulse generator.

A particularly suitable form for the blocking oscillator BLO is illustrated in FIG. 4. A normally non-conductive transistor Tr has its collector and emitter circuits coupled by means of windings $wc$ and $we$ of a coupling transformer Tf which also has an output winding $wo$. Resistor R2 and rectifier Rf are connected in parallel between the transistor base and earth. Blocking oscillator action is initiated by negative input pulse applied to the base of transistor Tr via resistor R1. This input pulse brings the transistor into conduction to initiate a blocking oscillator action which in well-known manner produces pulse $c$ of waveform W during conduction of the transistor and which in time results in the transistor returning to its non-conductive state accompanied by the generation of the pulse $r$.

Also within the start signal and clock pulse generator GN is a group of coincidence-of-four gates Gop . . . Gop8 one or another of which marks a lead $op$ when a data group (odd parity) has been read from the tape and stored in the temporary stores $tsa$ . . . $tsd$. To this end each of these gates has four input leads which are selectively cross-connected to the terminals $a0$, $a1$ . . . $d0$, $d1$ according to the particular combination of these terminals which will be marked by the stores $tsa$ . . . $tsd$ for a particular odd-parity combination of digits in a digit group: for instance if gate Gop1 has its four input leads cross-connected as indicated by the references $a1$, $b1$, $c1$, $d0$ appended to them, this gate will mark lead $op$ following the temporary storage of a digit group comprising a "1" digit in each of tracks A, B and C and a "0" digit in the parity track D. As there are eight possible odd-parity digit combinations there are eight gates in the group. The lead $op$ is taken as one input lead to a coincidence-of-two gate Gpc the other input lead of which is connected to the output of the blocking oscillator BLO.

In a like manner a group of three five-coincidence gates Gep1 . . . Gep3 are connected to respond following the reading of an even-parity start group, it being arranged that the three start groups ZS, XS, YS in a packet P are constituted by different even-parity digit combinations. Each of these gates Gep1 . . . Gep3 has four input leads cross-connected to terminals $a0$, $a1$ . . . $d0$, $d1$ according to the even-parity digit combinations of the start groups XS, YS and ZS respectively, and a fifth input leading connected to the output lead gc of the blocking oscillator BLO.

The gates Gpc and Gep1 . . . Gep3 are made responsive to inputs of the same polarity as pulse c in waveform W. Hence, following the reading of each start group ZS, XS or YS a start pulse coincident with this pulse c will be applied to lead epz, epx or epy as the case may be, whereas following the reading of each digit group a digit clock pulse will be applied to lead pc coincidentally with the pulse c. Thus for each packet of information P there is sequentially passed to the central control circuit CC a start pulse on lead epz, seven clock pulses on lead pc, a start pulse on lead epx, another seven clock pulses on lead pc, a start pulse on lead epy, and a final seven clock pulses on lead pc.

At the same time as a start or clock pulse is sent to the central control circuit the states of the three temporary storage elements tsa . . . tsc which relate to the data tracks, A, B and C are transferred by means of coincidence-of-two gates Gta . . . Gtc to a three-digit shift register (described later) included in the serialiser DS and connected to the outputs of these gates over leads ta . . . tc. These gates Gta . . . Gtc also respond to inputs having the polarity of pulse c of waveform W. Following this transfer the temporary stores tsa . . . tsd are reset to their unset ("0") state by the opposite polarity pulse r of waveform W, the output lead gc of the blocking oscillator BLO being extended to stores tsa . . . tsd for this purpose.

Central Control Circuit CC (FIG. 5)

In the central control circuit each clock pulse received thereby on lead pc initiates a train of pulses which terminates before the next clock pulse arrives. In addition to providing these pulses, which are used inter alia as stepping or shift pulses for stepping digital information into or out of various shift registers, the central control circuit also provides digit timing pulses and certain reset and transfer signals the function of which will appear later. It also provides switching signals which control the connections of the servo-mechanisms so that although they all receive the output from the digital/analogue converter DA, the only one which responds is the one which controls movement in the relevant direction according to the particular X, Y or Z block of information from which this output was derived.

Referring to FIG. 5 each clock pulse appearing on lead pc is applied to the input of a serial chain of delay circuits DL1 . . . DL9 the sum of the delays of which is less than the time interval between the successive clock pulses, that is, less than the time interval between successive digit groups as read from the tape. Leads dl1 . . . dl9 connected respectively to the outputs of the several delay circuits therefore each receive in sequence a single pulse resulting from clock pulses. The pulses appearing on leads dl1, dl4 and dl7 are applied through a combining ('R') gate Gp a lead p': pulses appearing on leads dl2, dl5 and dl8 are applied through the combining gate Gq to a lead q': and the pulses appearing on leads dl3, dl6 and dl9 are applied through a combining gate Gr to a lead r'. For each clock pulse received on lead pc therefore, there appears on leads p', q' and r' respective pulses appearing in a time sequence which occurs three times over: that is, for each clock pulse pulses appear on these last-mentioned leads in the order p, q, r, p, q, r, p, q, r. These pulses are power amplified in amplifying units AU1, AU2, AU3 and appear on leads pp, qq, rr; they are also taken through single-coincidence "or" gates Gp', Gq', Gr' to power amplifying units AU1', AU2', AU3' and appear on leads p, q, r. The amplifying units give the pulses on leads p, q, r, pp, qq and rr a suitable form and sufficient power to drive various ferrite core circuits (such as the shift registers already referred to) which require substantial driving power.

A start pulse appearing on any one of leads epx, epy or epz of FIG. 2 is applied (FIG. 5) through an "OR" gate Gst to a resetting lead rs which extends to the gates Gp', Gq', Gr'. Consequently in response to a start pulse a driving pulse appears on each of the leads p, q and r and this has the result of resetting to a starting condition the core circuits driven over these leads, as will appear hereafter.

A start pulse on any of the leads epx, epy and epz is likewise applied via gate Gst to a lead ec leading to a gate Gec the purpose of which will be explained later.

A start pulse on any one of leads epx, epy, epz is further applied via an individual delay circuit DL10, DL11 or DL12 and an "OR" gate Gd to the first stage of a multi-stage shift register serving as a digit timing pulse generator DT. According to the form of this shift register stepping or shift pulses are applied to it, as represented by the lead s, from at least one of the leads p, q and r so that the pulse initially registered in the first stage (0) is shifted from stage to stage and in doing so results in pulses being sequentially applied to output leads d1 . . . d21 from the several stages. As will appear later the time period between successive pulses on each one of the leads p, q and r corresponds to the digit periods of the digits as read from the tape and subsequently serialised. Consequently the pulses appearing on leads d1 . . . d20 coincide with these digit periods, there being 9+11=20 digits per X, Y or Z block of information as recorded. The pulses from stage 1 coinciding with the digit period for the first digit are taken on an individual lead d1 whereas the pulses from stages 2–9 inclusive are taken on a single lead d2–9 and the pulses from stages 10–20 inclusive are likewise taken on a single lead d10–20. The output lead d21 from the last stage 21 is taken as a second input to gate Gec. Other output leads ig, rt and t are taken from stages 7, 9 and 10 respectively of the digit timing pulse generator DT for purposes to be described later.

The digit timing pulse generator DT may be a ferrite core shift register similar to that used for the instruction staticiser IS and described later with reference to FIG. 6: in this form the digit pulse timer would be stepped by the pulses on two of the leads p, q and r. In other words there would be two stepping or shift pulse inputs rather than the single representative lead s.

The outputs from delay circuits DL10 . . . DL12 are also taken to individual re-circulating stores CDL1, CDL2, CDL3 in which a start pulse appearing on any one of leads epx, epy and epz will continuously circulate until inhibited in an inhibiting gate Gh, by a resetting pulse appearing on lead rs' following the next start pulse. A pulse circulating through any one of the stores CDL1 . . . CDL3 continuously re-appears on the relavent one of three leads hx, hy, hz, and also at one input of respective coincidence-of-two gates Gs3, Gs1, Gs2, the other inputs of which are connected to the output lead t from stage 10 of the digit timing pulse generator DT. A pulse passed by any one of these gates sets one of three bistable elements SWz, SWy, SWx from which extend output leads swz, swy, swx for controlling the switching of the servo-mechanisms. The reason for the particular order of connection of leads hx, hy, hz to gates Gs1–3 will be explained later.

Figure 6:
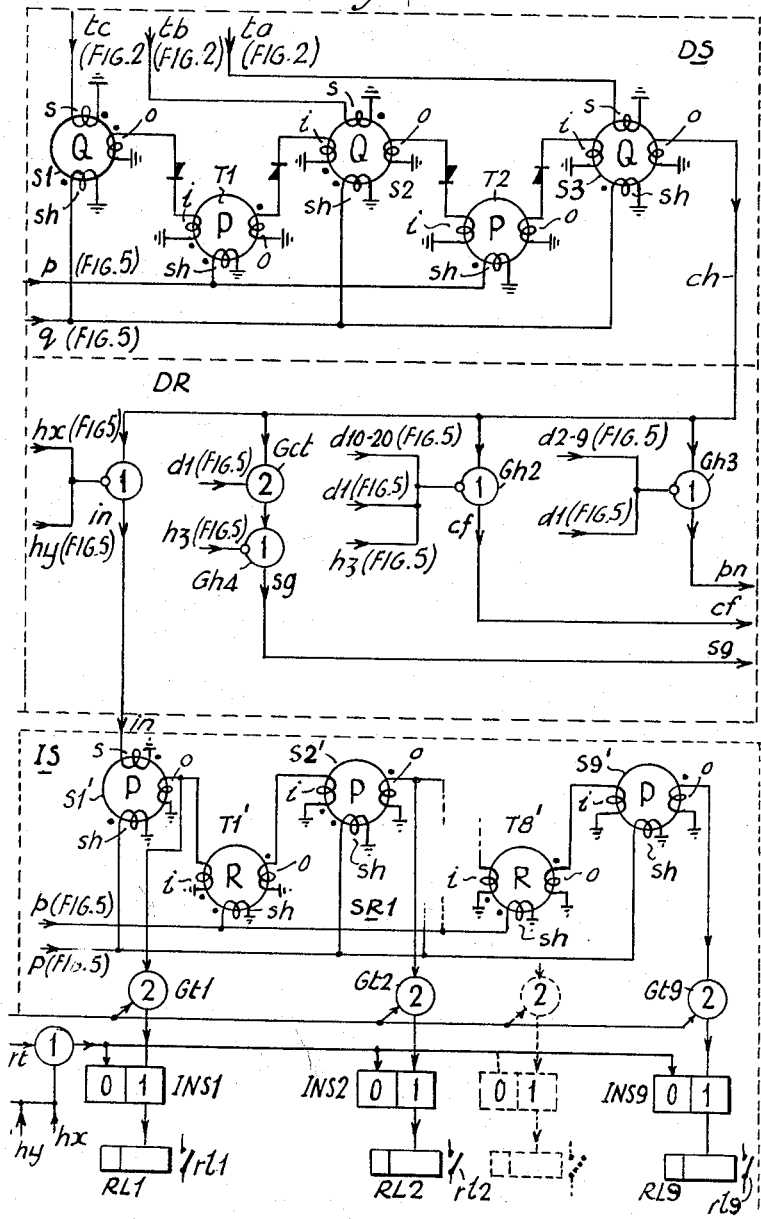
FIG. 6 illustrates a serialiser, a distributor and an instruction store circuit.

Serialiser DS (FIG. 6, Top)

The function of the serialiser is to accept data from the three data tracks A, B and C on the recorded tape and to re-assemble the data digits from their parallel-serial mode into a serial mode on a single channel. To this end the data digits of each successive group as stored in the temporary stores tsa, tsb and tsc (FIG. 2) and transferred into the shift register of the serialiser as previously explained, are transferred in turn into the single output channel ch (FIG. 6), the least significant digit being first, by means of appropriate shift pulses applied to the shift register from two of leads $p$, $q$ and $r$ from the central control circuit (FIG. 5). More particularly as shown in FIG. 6 the serialiser DS comprises a ferrite core shift register comprising three storage cores S1, S2, S3 and intermediate, transfer, cores T1, T2. Each of these cores has a number of windings identified according to their function as follows: $s$ indicates a setting winding, $i$ represents an input winding (which has the same effect as a setting winding), $o$ represents an output winding and $sh$ represents a resetting shift winding. The leads $ta$, $tb$ and $tc$ from the temporary stores are connected to the setting windings of cores S3, S2, S1 respectively so that a pulse on any one of these leads, representing a "1" digit read from the relevant track on the recording tape, will set the core to one of its two stable stages of magnetization, each core otherwise remaining unset in its other stable condition of magnetization. The shift windings $sh$ of the cores S1, S2 and S3 are connected to lead $q$ from the control circuit and the corresponding windings on the intermediate cores T1 and T2 are connected to lead $p$. The pulses on lead $q$ therefore attempt to reset the cores S1, S2 and S3 and will produce an output pulse in the winding $o$ if the core was in the set state immediately beforehand: if the core was unset no output winding is obtained. The pulses on lead $p$ similarly tend to reset the cores T1 and T2, producing a pulse through windings $o$ if they were previously set. The output windings of cores S1 and S2 are connected to the input windings of cores T1 and T2, whose output windings are connected to the input windings of cores S2 and S3. The action of this form of shifting register is well-known. If core S3 is initially set by a pulse on lead $ta$ the first $q$ pulse to arrive will reset this core and produce an output pulse on the channel $ch$. At the same time the condition of the cores S1 and S2 will be transferred by this $q$ pulse into the cores T1 and T2. This $q$ pulse coincides with the first digit period as defined by the first sequence of pulses produced on leads $p$, $q$, $r$ in response to the clock pulses corresponding to the digit group registered in the cores S1—S3. The next $p$ pulse likewise transfers the conditions of the transfer cores T1 and T2 to the storage cores S2 and S3 so that the next $q$ pulse, coinciding with the second digit period for this same digit group, will cause a pulse to be applied to the channel $ch$ if the second (B track) digit was a "1." This same $q$ pulse transfers the state of the core S2 (now representing the third digit of the group) to the transfer core T2, so that the next $p$ pulse transfers the state of this core to core S3 and the next $q$ pulse produces an output pulse on the channel $ch$ if the third digit was a "1." The three digits of a group have therefore been serialised on to the channel $ch$ by the three sequences of pulses on leads $p$, $q$, $r$. The pulses on lead $r$ are not used here, but it will be appreciated that the required shifting action could be obtained using pulses from any two of the leads $p$, $q$ and $r$.

The described action of the serialiser applies in respect of groups of data digits. The start groups are given exceptional treatment in that the storage cores S1, S2 and S3 of the serialiser shift register will become set according to the digits in the start group but will be then immediately cleared by the resetting pulse applied in response to the starting pulse (lead $rs$, FIG. 5) to all three of the leads $p$, $q$ and $r$ so that all the cores S1, T1, S2, T2 and S3 are immediately reset. By the action of the serialiser the data digits recorded in serial-parallel mode on the recording tape and converted into a serial mode in conformity with the serial sequence shown in FIG. 1.

*Distributor DR (FIG. 6, Middle)*

The distributor has the function under the control of the pulses on leads $d1 \ldots d20$ and $hx$, $hy$ and $hz$ from the central control circuit (FIG. 5) of routing the serialised digital data from the serialiser to its proper destination. In particular the nine instruction digits are sent over lead $in$ to the instruction staticiser IS, the digits constituting the X, Y and Z positional numbers are sent over lead $pn$ to the combining unit CU, sign digits of the selection numbers are also sent to the combining unit over lead $sg$, and the digits constituting the two selection numbers are sent to the multiplier, all in the time order in which they come from the serialiser DS. Referring to FIG. 6 the serialised digit pulses on channel $ch$ are applied in common to three inhibiting gates $Gh1$, $Gh2$, $Gh3$ and to a coincidence-of-two gate $Gct$. For the X and Y blocks of information the gate $Gh1$ is inhibited by the pulse repeatedly appearing on leads $hx$ and $hy$ respectively so that this gate passes from the channel $ch$ only pulses relating to digits in the Z block of information. These pulses are passed on lead $ins$ to the instruction store IS which as will appear hereinafter stores the first nine digits of the Z block, namely the instruction digits.

Gate $Gh2$ takes its second input from the lead $d1$ from the first stage of the digit timing pulse generator DT in the control circuit (FIG. 5). If the first digit of a serialised block is a "1" the pulse appearing for it on channel $ch$ will therefore pass through the gate $Gct$ to another inhibiting gate $Gh4$. For the Z block of information this gate $Gh4$ is inhibited by the pulses on lead $hz$ on the central control circuit so that pulses can pass through this gate only for the X and Z blocks of information, in which it will be recalled the first digit is the sign digit for the correction number. Accordingly a pulse will appear on the output lead $sg$ of the gate $Gh4$ to indicate a "1" sign digit: for a "0" sign digit no pulse will appear.

The correction factors occur in the X and Y blocks of information and are constituted by the second to ninth digits in these blocks. Gate $Gh2$ is inhibited for the Z blocks of information by the pulses appearing on the lead $hz$ from the central control circuit, and is also inhibited by the pulses appearing on leads $d1$ and $d10$–$20$. Consequently only pulses corresponding to the digits of the correction factors will be passed by gate $Gh2$ and will appear on the output lead $cf$ of this gate. Gate $Gh3$ is inhibited by the pulses on leads $d1$ and $d2$–$9$ (corresponding to the instruction digits and the correction factor digits with the sign digits). Consequently only pulses corresponding to the X, Y and Z position numbers will be passed by gate $Gh3$ from the channel $ch$ and will appear on the output lead $pn$ of this lead. It will be assumed that gates $Gct$ and $Gh1$—$Gh4$ function without introducing significant delay.

*Instruction Store IS (FIG. 6, Bottom)*

The instruction store includes a shift register SR1 which has just sufficient capacity to accept and register the nine instruction digits in a packet of information. As shown in FIG. 6 the instruction store shift register may be a ferrite core circuit similar to that constituting the serialiser DS and comprising nine storage cores S1'–S9' (corresponding to the number of instruction digits) with intermediate transfer cores T1'–T8'. These cores have various windings identified by reference letters $i$, $s$, $o$ or $sh$ having the same significance as before. This core circuit differs from that of the serialiser only in that only the first storage core has a setting winding $s$: this winding receives on lead $ins$ the pulses passed for a Z block of information by gate $Gh1$ in the distributor DR. Consequently in each digit period the core S1' assumes a condition corresponding to the value of the digit in that period, being set by a pulse received over lead $ins$ for a "1" digit and left unset if no pulse is received. By the shift pulses on leads $p$ and $r$ from FIG. 5, the conditions of the storage cores S1'–S9' are stepped from one to the next, via the transfer cores T1'–T8', until on the ninth digit period, following the pulse for that period on lead $r$, the first nine digits of the Z block of information, namely all the instruction digits, have been registered in the storage cores S1'–S9', the first digit being registered in core S9', the ninth in core S1'. Connected via gates $Gt1 \ldots$ G*t*9 to the output windings *o* of the storage cores S1'–S9' of the instruction staticiser are nine bistable circuits INS1 . . . INS9 constituting digit stores for the instruction digits. Each of these bistable circuits may for example comprise two transistors crosscoupled with each other in known manner to form a bistable pair. When the instruction digits have been registered in the storage cores S1'–S9' as described above, they are then transferred by means of gates G*t*1 . . . G*t*9 to the bistable digit stores INS1 . . . INS9 each of which is set to a "1" condition if the relevant instruction digit was a "1," and is left unset in "0" condition if the relevant digit was a "0."

The transfer takes place by reason of the fact that gates G*t*1 . . . G*t*9 are opened via lead *t* on the tenth digit period so that on the occurrence of the pulse on lead *p* for that period, an output pulse from any one of the cores S1'–S9', which are at this time still storing the nine instruction digits, will pass through the associated gate G*t*1 . . . G*t*9 to set the relevant store INS1 . . . INS9. The register SR1 thereafter continues to receive digit pulses over lead *ins* but this has no effect on the stores INS1–9. These stores are not cleared (that is, reset) until immediately before a new set of instruction digits is transferred to them. To this end resetting lead *rt* from the ninth stage of the digit timer DT is connected to them via an inhibiting gate G*r* which is inhibited during the X and Y blocks of information by the pulses on leads *hx* and *hy*. Consequently the stores INS1–9 are reset on the ninth digit period of only the Z blocks of information.

Each of the instruction digit stores INS1 . . . INS9 controls a relay, RL1 . . . RL9, that is operated or left unoperated according as the stored instruction digit is a "1" or "0" respectively. The relays RL1 . . . RL9 may be made relatively slow to operate and to release so that no change in their condition takes place unless a new instruction has been well established by repetition, thereby minimising the possibility of false operation. By their contacts such as *rl*1 . . . *rl*9, in a manner not shown, the relays RL1 . . . RL9 control the functions to which the instruction digits relate. If the total number of functions to be controlled is greater than nine, the instruction digits may be coded in various combinationss which can be appropriately decoded in the instruction staticiser and store.

*Multiplier M (FIG. 7)*

The function of the multiplier M is to accept a manual setting of the amount by which the actual cutter radius of a machine tool being controlled differs from the nominal cutter radius for which the recorded positional information was computed, and to resolve this into X and Y positional corrections by multiplying it digitally into the relevant correction numbers as recorded along with the position numbers. The multiplier includes a plurality of switching connections *sc*1 . . . *sc*7 which, by the provision therein of appropriate switching means schematically represented by the contacts labelled $2^0$ . . . $2^6$ in FIG. 7 can be manually opened or closed to represent in binary notation the magnitude of the cutter radius difference, if any. For this purpose, and in order to permit the manual switching to be readily effected on a decimal basis, there may be associated with the multiplier two multi-position, multi-bank digitising switches (not shown) which can be set on a decimal basis but control the switching connections on a binary basis. One of these switches, arranged to deal with the digits of least ($2^0$) and next-to-least ($2^1$) significance in the radius difference as expressed in binary notation, could be a two-bank switch having four positions representing decimal settings of 0.0, 0.1, 0.2, 0.3 thousandths of an inch. This switch closes one or other or both of the two switching connections *sc*1 and *sc*2 according to the two-digit binary equivalent of this decimal setting. The other switch could then be a five-bank switch having twenty-four positions representing decimal settings of 0.0, 0.4, 0.8, and so on in steps of 0.4 thousandths of an inch up to 9.2 thousandths, this switch being effective to close a combination of the five other switching connections *sc*2 . . . *sc*7 according to the five-digit binary equivalent of its decimal setting. The radius difference could then be set in as the sum of the decimal settings of the two switches, the maximum radius difference catered for being therefore 9.2+0.3=9.5 thousandths of an inch in unit steps of 0.1 thousandths (i.e. $2^0$=1 unit=0.1 thou.).

In the multiplier M the switching connections *sc*1 . . . *sc*6, that is, those except the one relating to the most significant digit of the digitised radius difference, connect the lead *cf* from the distributor DR (FIG. 6) to one input *it*1 of respective serial adders A1 . . . A6 (represented in FIG. 7 by rectangles with + signs). It will be recalled that the lead *cf* is the one to which the distributor passes pulses representing "1" digits of the serialised correction numbers. The remaining switching connection *sc*7 connects this same lead *cf* to a delay element DL15 having a delay of "1" digit period. The serial adders A1 . . . A6, which also have a delay of "1" digit period each, are connected in cascade, in reverse order of the significance of the digits to which their respective switching connections relate, between the delay element DL15 and a second delay element DL16 which also has a delay of "1" digit period: that is, a second input terminal *it*2 of adder A6 is connected to delay line DL15, output terminals *ot* of adders A6 . . . A2 are connected to the second input terminals *it*2 of adders A5 . . . A1 respectively, and output terminal *ot* of adder A1 is connected to delay line DL16. (It is assumed that a three-position switch SS, the purpose of which will be explained later, is in its first position as shown). An output lead *rc* from delay element DL16 extends to the combining unit CU.

The action of the multiplier M is that when the distributor DR routes on to lead *cf* the pulses corresponding to "1" digits of a serialised correction number, the least significant pulse arrives first and immediately offers to the serial adders A1 . . . A6, through those of switching connections *sc*1 . . . *sc*7 that are closed according to the magnitude of the radius difference, a parallel (that is, simultaneous) digital representation of this radius difference multiplied by least significant "1" digit of the correction number. This constitutes a first partial product. The one digit period delays provided by the delay element DL15 and each of the adders A6 . . . A1 result in a conversion from parallel to serial representation, so that this first partial product begins to emerge from the last amplifier in serial form. The next "1" digit pulse on lead *cf* forms another partial product in the same way and is immediately added in parallel to the first partial product with the correct relative numerical significance, because the first partial produce moved along the adders by the relevant number of digit periods before the second partial product is presented to the adders. Successive input pulses add their respective parallel products in the same way, and the result is that there emerges serially from the multiplier M, on output lead *rc*, the full length product of the serial digital input represented by the pulses on lead *cf* and the parallel input represented by the settings of the switching connections *sc*1 . . . *sc*7.

Assuming that each correction factor digit and the immediately following position number digits are subject to the same overall delay as each other before appearing on the distributor output leads *cf* and *pn* respectively, then the delay of one digit period imposed by the delay circuit DL16 gives the result that in the digital information presented on the multiplier output lead *rc* (representing the tool radius correction that has to be made to the position number), each digit will coincide in time with the digit of like significance in the position number information as presented on lead *pn*.

That the timing of the output digit pulses from the multiplier M is correct in this respect, namely having regard to their significance relative to that of the positional digits leaving the distributor, can be demonstrated by considering a simple case in which the multiplier's switching connections sc1 . . . sc7 are set to represent a radius difference of 0.1 thousandth of an inch and a correction factor of unity is read from the tape, thus requiring that the positional number which immediately follows the correcting number on the tape should be corrected by 0.1 thousandth of an inch. The correcting factor as serialised is constituted by a sequence of seven "0" digits followed by a single "1" digit in the most significant digit place, representing unity as previously stated. When the pulse corresponding to this single "1" digit appears on the input lead cf to the multiplier, it passes through the closed switching connection sc1 to the input it1 of the last adder A1 in the cascade connection, this switching connection sc1 being the only one which has been closed (corresponding to a radius difference of 0.1 thou.). There being no input to terminal it2 of adder A1 a pulse is passed to the multiplier output lead rc with a delay of two digit periods—one in the adder A1 and the other in the delay element DL16. As a result, recalling that the least significant digit of the serialised positional number immediately follows in time the most significant digit of the serialised correcting number (cf. FIG. 1), the delayed digit pulse from the multiplier M appears on lead rc at the same time as the second digit of the positional number is being presented on lead pn by the distributor. Since a digit in the second digit place of the positional number represents 0.1 thousandth of an inch (the first, least significant, digit representing $\frac{1}{20,000}$ of an inch as already stated), and since the correction digit pulse on lead rc has also to represent 0.1 thousandth of an inch, the required coincidence of digit significance will be seen to have been achieved.

It would therefore be possible for the radius correction information on lead rc and the position number information on lead pn to be fed to an adder in the combining unit CU for addition one to the other. If, however, either information has to be further delayed before reaching this adder (for instance the processing of the radius correction information according to the sign of the correction may impose a delay) then the other information would have to be passed to the adder through a delay circuit giving a similar delay. The adders A1 . . . A6 in the multiplier M may take any form suitable for performing the well-known required logical functions of such adders. An example of a suitable adder using ferrite cores controlled by the shift pulses on leads p, q and r from the central control circuit is illustrated in FIG. 8.

In FIG. 8 the cores have various windings labelled i, o and sh having the same significance as before, and certain of the cores have an additional winding labelled h which is an inhibiting winding acting in opposition to the input winding i, so that whereas an input pulse applied to the winding i would normally set the core, the core will be left unset if at the same time as the pulse is applied to this input winding i a pulse is also applied to the inhibiting winding h. Referring to FIG. 8 the adder illustrated consists of two "half-adders," one of which is constituted by cores 1, 2, 3 and 4 and the other of which is constituted by cores 5, 6, 7 and 8. The input terminals it1 and it2 to the adder constitute the input terminals to the first half-adder and points it1' and it2' are corresponding input points to the second half-adder. Considering the first half-adder as typical, it has to fulfil the following logical functions: for a pulse representing a "1" digit applied to terminal it1 or it2 (but not to both of them simultaneously) the half-adder has to produce an output "sum" pulse representing a "1" digit; for input pulses representing "1" digits appearing simultaneously at terminals it1 and it2 the half-adder has not to provide a "sum" pulse but has to provide a "carry" pulse. This "carry" pulse has to be propagated to the next order of digit significance, and the second half-adder (cores 5, 6, 7 and 8) serves for adding the propagated "carry" pulse to any "sum" pulse produced by the first half-adder in respect of this next order of digit significance. More particularly a pulse appearing at either terminal it1 or terminal it2 will set the core 1 or 2 by its input winding i and the next pulse to occur on the lead p from the central control circuit will reset this core by its winding sh and produce an output pulse in its winding o. This output pulse sets a core 9 which on the next pulse on lead q is reset to apply from its output winding o an input pulse to the input point it1' of the second half-adder. The core 9 is introduced solely as a buffer and amplifying stage. Assuming that there is no propagated carry pulse to be added to this "sum" pulse at terminal it1', this pulse will set core 5 which on the next pulse on lead r will produce an output pulse in its winding o. This pulse is passed to the output terminal ot of the adder via a buffer and amplifying stage which in this case is shown as comprising an n-p-n transistor Tr0 to the base of which the output pulse from core 5 is applied and in the emitter circuit of which is included a current stabilising resistor R3. The transistor Tr0 is normally non-conductive and is rendered conductive for the duration of the output pulse from core 5, producing a resulting pulse at the output ot: with the circuit as shown, this output pulse is a current pulse as is required for instance for feeding into a following ferrite core circuit for which an input winding i' is shown dotted.

It will be seen that the total delay between the application of an input pulse to terminal it1 or it2 and the production of an output pulse at the terminal ot corresponds to a single digit period as defined by a single sequence of pulses on the leads p, q and r from the central control circuit. Instead of using a transistor circuit for shaping the output pulse as described, it may be desirable to employ an additional core serving the same purpose as the core 9. However, as this core would have to be reset to produce the output pulse by a pulse occurring at one of the leads p, q and r in the next digit period, the use of such core would be seen to introduce a further delay of at least one-third of a digit period. This additional delay would have to be catered for in the design of the multiplier M by the provision of appropriate additional delays between the multiplier input lead cf on the one hand and the adders A1 . . . A6 and the delay circuit DL15 on the other hand.

If input pulses appear simultaneously on input terminals it1 and it2 the connection of inhibiting winding h of core 2 to terminal it1 and the corresponding connection of the inhibiting winding h of core 1 to terminal it2 prevents either of these cores from becoming set. Consequently on the next pulse on the lead p no output pulse is applied towards the core 9. In this circumstance, however, a carry pulse has to be produced and this is achieved by the cores 3 and 4. The condition for a carry pulse is the absence of a "sum" pulse and the presence of two input pulses, only one of which need be inspected because if the other was not present the condition of no "sum" pulse would not obtain. A pulse appearing at terminal it2 is therefore connected to set the core 3, which on the next pulse appearing on lead p produces an output pulse which attempts to set the core 4. If an input pulse is present only at terminal it2 an output "sum" pulse would be obtained from core 2 at this time and this "sum" pulse, applied to the inhibiting winding h of core 4, prevents this core from becoming set. Hence on the next pulse on the lead r, which would have produced an output pulse from the core 4 if this core had been set, no output carry pulse from this core is obtained. If, on the other hand, input pulses had been applied to both of terminals it1 and it2, no "sum" pulse would have been applied to the inhibiting winding h of core 4 from cores 1 and 2. Consequently, this core 4 would be set by the pulse received from core 3 and on the next pulse from the lead r would produce an output carry pulse which sets a core 10. On the next pulse on lead q, which will occur in the next digit period, the core 10 then produces a propagated carry pulse which is applied to the input point it2' of the second half-adder. The second half-adder constituted by the cores 5, 6, 7 and 8 functions in an exactly similar manner depending on whether an input pulse appears at point it1' or it2' or at both of these points together. Any carry pulse from this second half-adder which is obtained from the core 8 sets the core 10 by which it is propagated to the next digit period before application to input point it2'. Where the added of FIG. 8 requires the same pulse to be fed to windings of more than one core (for instance a pulse at terminal it2 has to be fed to the input windings of cores 2 and 3 and to the inhibiting winding of core 1). These windings have been shown connected in parallel in order to make the logical operation of the adder more readily apparent. It will be appreciated, however, that in practice it would usually be preferable for such simultaneously fed windings to be connected in series.

*Combining Unit CU (FIG. 9)*

The function of the combining unit CU, which in the form illustrated in FIG. 9 includes an adder ACU and an add/subtract control circuit ASC, both in the form of ferrite core circuits driven by the pulses on certain of the leads pp, qq, rr from the control circuit of FIG. 5, is to effect algebraic addition of the digital position correction computed by the multiplier M and the relevant position number as read from the recording tape and serialised. The combining unit CU, which can be manually set by a switch SW according as the cutter being used is oversize (SW closed) or undersize (SW open) relatively to the nominal radius for which the positional information is recorded, receives the sign digit of the correction number over lead sg from the distributor. If the cutter is under size and the stored sign digit is, say, a "1" the position correction information received on lead rc from the multiplier has to be subtracted from the positional number information received on lead pn from the distributor; if the digit is "0" the correction has to be added. If the cutter is oversize the correction has to be added for a "1" sign digit and subtracted for a "0" sign digit. For addition, the digital information appearing on lead rc is passed through the add/subtract control circuit ASC, without inversion, to one input it1 of the adder ACU; that is, a digit pulse appearing on lead rc results in a digit pulse being applied to terminal it1, whereas a digit space (no pulse) appearing on lead rc results in a digit space appearing at terminal it1. For subtraction, the digital information on lead rc is inverted in the circuit ASC before application to the adder ACU, that is, a digit pulse on lead rc results in a digit space appearing at terminal it1, while a digit space on lead rc results in a digit pulse at terminal it1. While this does not give a true arithmetic subtraction, a true result can be obtained by injecting into the adder ACU a pulse corresponding in digital significance to the least significant digit of the position information. Using an adder such as that of FIG. 8 for instance this can be done by feeding into it, on lead su, a pulse derived from an appropriate stage of the digit period timer DT. To achieve subtraction, pulses coinciding with successive digit periods are applied to the input winding i of a ferrite core 11, while pulses corresponding to "1" digits on lead rc are applied to the input winding of a core 12. If no pulse is received on lead rc in any particular digit period, only core 11 will become set and the next pulse appearing on lead qq will produce from the output winding of this core a pulse which sets a further core 13. Consequently on the next pulse appearing on lead rr the output winding of core 13 will apply a pulse to terminal it1 of adder ACU. If, on the other hand, a pulse appears on lead rc in a particular digit period, then cores 11 and 12 will both become set. On the next qq pulse these cores 11 and 12 will produce respective output pulses which attempt to set cores 13 and 14 respectively, but they are inhibited from doing so by the inhibiting windings h on these cores. Consequently on the next rr pulse neither of cores 13 and 14 can produce an output pulse and therefore no pulse is applied to terminal it. When addition is called for, no pulses are applied to the input winding of core 11. An input pulse on lead rc therefore results in the setting of core 12, followed by the setting of core 14 which is not inhibited. Resetting of this core 14 by the next rr pulse, therefore applies a pulse to terminal it1. There is therefore no digit inversion in this instance.

A ferrite core circuit ASD similar to that just described, but having its cores 15, 16, 17 and 18 driven over the p, q and r leads, is used for determining whether subtraction or addition is called for. For an undersized cutter the switch SW is open so that a pulse on lead sg from the distributor (corresponding to a "1" sign digit, calling for subtraction with an undersize cutter) will result in the appearance of a pulse at the output point op of circuit ASD. This pulse sets a core 19, which on the next pulse on lead p from the distributor produces an output pulse which is applied to the input winding of core 11 in circuit ASC and is also applied to the input winding of a further core 20 which is driven by the pulses on lead r and by which therefore, with a delay of one digit period, the pulse is re-applied to the input winding of core 19 and thereafter continues to circulate via cores 19 and 20, being also repeatedly applied to core 11. No such circulating pulse is produced for a "0" sign digit and an undersize cutter. For an oversize cutter (switch SW closed) the digit timing pulse which appears on lead d1 (FIG. 5) in respect of the first digit in each block of information is applied to the input winding of core 15, via switch SW and a gate Gas which inhibits this pulse for the Z blocks of information. If a sign pulse is received on lead sg cores 15 and 16 now both become set and their subsequent output pulses mutually oppose in cores 17 and 18, which therefore remain unset. No pulse is therefore obtained at point op and no pulse circulates via cores 19 and 20. However, a digit space on lead sg, corresponding to a "0" sign digit results in only core 15 becoming set, so that there subsequently appears at point op, via core 17, a pulse which circulates via cores 19 and 20 and is repeatedly applied in successive digit periods to core 11 in circuit ASC.

The positional correction digits applied to terminal it1 of adder ACU, are added therein to the position number digits applied to the second input terminal it2 of the adder via a delay circuit DL17 which imposes on the digital position information on lead pn a delay commensurate with that to which the correction information is subject in the add/subtract control circuit ASC. With the circuits as described a delay of only one digit period is required in delay circuit DL17. The pulse circulation provided by cores 19 and 20 need therefore continue for only one digit period after the last digit of a position number appears on lead pn. Consequently this pulse circulation is stopped by the resetting action of the pulse applied to lead rs (FIG. 5) in response to the start pulse produced from the next start group. The circuits ASC and ACU however, and also the circuit CD about to be described, must be cleared at this time. It is for this reason that these circuits are driven from the leads, pp, qq and rr, on which the reset lead rs has no effect. There is in fact no need for these circuits to be cleared at all.

The setting of the combining circuit switch SW according to whether the cutter is undersize or oversize results in the path followed by the centre of the cutter being displaced in the appropriate sense with respect to the path computed for a cutter of nominal radius; that is, for an undersize cutter, the path it follows lies closer to the workpiece surface than does the computed path, whereas for an oversize cutter the path it follows lies further away. If a roughing cut is required, for which purpose it is necessary to control the movement of the cutter so that its centre follows a path which is further away from the workpiece surface than is the path followed on a finishing cut, the switch SW in the combining circuit may be closed as for an oversize cutter and the switching connections sc1 . . . sc7 of the multiplier M set in dependence on the thickness of excess material which the roughing cut is required to leave on the workpiece surface. This thickness of excess material will be equal to the quantity represented by the setting of connections sc1 . . . sc7, plus or minus the amount by which the radius of the cutter used for the roughing cut is undersize or oversize respectively. If desired, the allowance for a roughing cut may be increased to 2 or 4 times the quantity determined by connections sc1 . . . sc7 by switching into the output of the multiplier either one or two extra digit delays; this increases the numerical significance of the digits of the multiplier output, relatively to the position numbers, by 2 or 4 times respectively. For this purpose switch SS included in the multiplier M (FIG. 7) has a second position in which it includes a delay circuit DL18 in series with DL16, and a third position in which delay circuits DL18 and DL19 are included, each of these circuits DL18 and DL19 having a delay of one digit period.

Position Staticiser PS (FIG. 9)

The position staticiser contains a shift register SR which can hold 10 digits simultaneously. The least significant digit of the 11 digits constituting a corrected position number is discarded, by being shifted out of the last stage of the register as the other digits are shifted along. This register SR can be identical with the instruction staticiser (cores $S1'$ . . . $S9'$, $T1'$ . . . $T8'$, FIG. 6), except that it would have ten storage cores and nine intermediate transfer cores. In order to facilitate the design of the digital/analogue converter DA, this shift register SR preferably receives and registers the digits in accordance with the so-called cyclic progressive (Gray) code. The shift register SR in the position staticiser PS is therefore shown as being preceded by a coding circuit CD, which converts the pure binary code output of the combining unit CU (output of adder ACU) into the cyclic progressive code.

As is known, this conversion of a number from pure binary code to Gray code can be achieved by serially applying the digits constituting the number to one input of an adder (least significant digit first) and also applying the digits to a second input of the adder with a delay of one digit period, all carry digits being ignored. For this purpose, referring again to FIG. 9, the digits appearing at the output of adder ACU in the combining unit CU are applied to the input windings $i$ of two ferrite cores 21 and 22. The output winding of the core 22 is connected to the input winding of a further core 23. An output pulse from adder ACU sets cores 21 and 22. Assuming that this output pulse is produced by the action of a pulse on lead $rr$ from the central control circuit (as would be the case if the adder ACU were connected according to FIG. 8), then on the next pulse on lead $pp$ core 21 is reset to produce an output pulse. Core 22, however, remains set until the next pulse on lead $qq$, which resets it and causes it to produce an output pulse which sets core 23. Consequently the next $pp$ pulse, occurring in the next digit period, resets this core 23 to produce an output pulse delayed by one digit period with respect to the output pulse produced by core 21 in consequence of the same digit pulse from adder ACU. The digital information from adder ACU therefore appears at points $ip1'$ and $ip2'$ with a time difference of one digit period and the digits are added (carry digits being ignored) by cores 24 and 25 acting in a manner similar to that already described for cores 1 and 2 in the adder of FIG. 8. The conditions for conversion to Gray code have therefore been fulfilled so that the output on lead $cd$ from the coder CD represents the corrected positional information in Gray code.

Between the encoder CD and the position register SR is inserted a delay circuit DL20 which introduces a delay of the requisite number of digit periods to give the result that all the position digits will be registered in register SR on the occurrence of a transfer pulse on lead $t$ during the reading of the next block of information from the tape. For instance if the position digits relate to an X position number, the delay circuit DL20 ensures that they are registered in the register SR when a pulse appears on lead $t$ from the digit timer DR consequent on the reading of the following Y block of information.

The position staticiser PS also contains 10 digit stores PSN1 . . . PSN10, constitutes by bistable transistor circuits for example, to which the most significant 10 digits of each corrected position number received by the staticiser PS are transferred simultaneously whenever they have been assembled in the shift register SR. These digit stores are cleared (by a pulse on lead $rt$) just before fresh position information is transferred to them from the shift register SR by a pulse on lead $t$, their setting and transfer being effected in exactly the same way as already described for the instruction digit stores INS1 . . . INS9 in FIG. 6.

Digital/Analogue Converter DA (FIG. 9)

The function of this converter, which is only partly illustrated, is to translate the digital form of the corrected position information as set up in the position staticiser into voltages of corresponding magnitude suitable for feeding to the controlling servo-mechanisms. For this purpose the converter includes a network of precision resistors which can be connected into any one of 1024 distinct combinations, depending on the value of the 10-digit binary number set up on the staticiser stores. The selective connection of the network resistors can be effected by means of ten relays RL1' . . . RL10' each of which is operated or left unoperated dependent upon whether or not the corresponding staticiser store PSN1 . . . PSN10 has been set to represent a "1" digit. It is not thought necessary to show a detailed example of digital-to-analogue converter as many examples are well-known in, for example, the computer art. Indeed it will be recognised that many of the techniques used in the present embodiment of the invention are based on those of the computer art.

The controlling servo-mechanisms may take any form suitable for appropriately controlling the movement along the X, Y and Z direction in dependence upon the voltage output which the digital/analogue converter DA produces in correspondence with the corrected positional information obtained respectively from the X, Y and Z blocks of recorded information. The particular form of servo-mechanism used will depend upon the particular form of device which is employed for detecting the instantaneous position of the cutter along the relative direction of movement. As servo-mechanisms are also very well-known it is not thought necessary to illustrate details of any particular form. Assuming for example, however, that the servo-mechanisms are of a form employing position-sensing devices constituted by rotary resolver synchros or by devices such as described in my patent 3,002,104, September 26, 1961. The servo-mechanisms will require to be fed from the digital/analogue converter DA with two voltages which vary respectively as sinusoidal and cosinusoidal functions of a radian measure which represents the magnitude of the analogue quantity set up in the converter. To this end the converter DA may take the form described in my abandoned application Serial No. 748,469 or that described in my copending patent application Serial No. 63, 536. After the relays of the converter have been set according to a corrected position number, a timed interrogating pulse may be fed to the converter to produce, on two separate channels $ch1$ and $ch\,2$, analogue output pulses which are balanced to earth and vary as the required sinusoidal and cosinusoidal functions respectively. The interrogating pulses, applied to the converter for this purpose over lead $ip$, can be derived from a bistable circuit I which is triggered by a pulse on lead $ig$ from the central control circuit and is reset by the following pulse on lead $rt$, thereby to produce, once per block of recorded information, a timed pulse which occurs just ahead of the reset signals applied to the position staticiser.

It will be appreciated that in this way the information transferred to the digital/analogue converter DA during a block period is interrogated in the next block period, for instance information relating to an X position number, transferred into the counter during the reading of the following Y block as already explained, is interrogated during the reading of the following Z block.

The output of the digital/analogue converter DA is passed to one or another of the servo-mechanisms SXM, YSM, ZSM, depending on the particular one of three relays RL$x$, RL$y$, RL$z$ that is operated. These relays are operated via gates G$s$1–3 in the control circuit CC (FIG. 5) and their associated bistable circuits SW$x$, SW$y$ and SW$z$. As determined by the connections of gates G$s$1–3 to leads $hx$, $hy$, $hz$, relay RL$x$ is operated by the transfer pulse occurring during the reading of a Y block (this relay being therefore in its operated condition on the occurrence of the interrogating pulse in the next [Z] block as required), relay RL$y$ is operated by the transfer pulse occurring during the reading of a Z block and relay RL$z$ is operated by the transfer pulse occurring during the reading of an X block. Consideration of the relative timings of the interrogating and transfer actions in relation to the block periods will show that these connections give the required result.

In each controlling servo-mechanism, as is usual, an error signal is obtained which is proportional to the divergence of the actual position from that called for by the positional information fed in from the digital/analogue converter. Since the positional information is fed in as a pulse, the error signal will also be in the form of a pulse of magnitude proportional to the error. However, the servo-motor of the system would usually require to be driven by a continuous signal proportional to error. This could be obtained from the error pulse by the circuit of FIG. 10.

Figure 10:
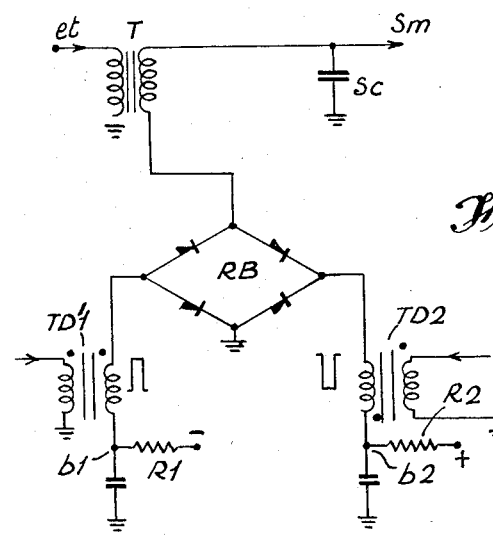
FIG. 10 illustrates a circuit for converting a pulse signal into a continuous signal more suitable for application to a servo-motor.

Referring to FIG. 10, the error pulse would be applied at terminals $et$ to the primary winding of a transformer T. The secondary winding of this transformer is connected between a storage capacitor SC and one corner of a rectifier bridge RB, the diagonally opposite corner of which is connected to earth. The capacitor SC is also connected to earth. The two other corners of the bridge RB are connected through the secondary windings of respective transformers TD1, TD2 to bias points $b1$ and $b2$. These points are held via resistors R1 and R2 at biasing potentials of opposite polarities such as back-bias rectifiers of bridge RB. There is therefore normally no discharge path for the capacitor SC, which accordingly applies to a terminal $sm$ a voltage which remains approximately equal to that to which the capacitor was last charged. Coincidentally with the integrating pulse already referred to, demodulating pulses are applied to the primary windings of transformers TD1 and TD2 which are so connected that there then appear in the secondary windings pulses which overcome the bias voltages at points $b1$ and $b2$ respectively. Consequently at the time of application of an error pulse to transformer T, the rectifiers of the bridge RB are temporarily forward-biased by the coincident demodulating pulses, and during this time the charge on capacitor SC can therefore adjust itself to the error voltage then induced in the secondary winding of transformer T. Capacitors C1 and C2 afford low impedance paths for the demodulating pulses in the secondary windings of transformers TD1 and TD2. Terminal $sm$ therefore tends to be held by the capacitor SC at a voltage substantially proportional to the error, this voltage being continuous and being therefore suitable for application to a servo-motor.

The servo-mechanism that receives the interrogated position information therefore acts to produce, along the relevant direction, movement tending to bring the actual position as sensed by the position-sensing device into coincidence with the position called for by the information contained in the voltages fed to the servo-mechanism from the digital/analogue converter.

An error checking circuit which gives an alarm indication if the recording on the tape is faulty or if faults arise in the reading of the recorded data or in the timing of the sequence of processing operations occurring within the period of a packet of information may be included in the central control circuit CC for operation in the following fashion, referring again to FIG. 5.

A monostable circuit MC is set into its unstable (U) state at the beginning of an operation by a pulse applied to it from a lead $mc$ via an "OR" gate G$mc$. This pulse can be derived in any convenient manner. The monostable circuit MC tends to drift back to its stable state (S) if not otherwise prevented from doing so. If it reaches its stable state or a condition sufficiently close to it, it indicates a fault condition by operating a relay RLF for example. During correct operation, the start pulse sent to the central control circuit CC on one of the leads $epx$, $epy$, $epz$ at the beginning of each block of information initiates the operation of the digit timing pulse generator DT, which finally provides, on lead $d21$, an end signal which should normally occur simultaneously with the next starting signal. It will be appreciated that in this respect the digit timing generator DT acts as a counter of the clock pulses: if a clock pulse fails to be generated in response to what should be an odd-parity data group, the circuit DT will fail to reach its last stage before the next start group is read. Coincidence with a start signal of an end signal from circuit DT is detected by coincidence gate G$ec$ the resulting output from which is applied via gate G$mc$ to set the monostable circuit MC away from its stable condition. Should one or more of the digit groups in a block of information fail to have the correct parity as recorded or read, the next starting signal will not coincide with an end signal from the timing circuit DT and the monostable circuit MC will be allowed to continue its drift towards fault indication. The rate of drift may be chosen to allow several faulty blocks of information to occur before the alarm indication is given: it is thus possible to permit operation to continue, without an alarm indication being given, if there is only an occasional digital error. This will be permissible because it will not result in significant detriment to a shape being formed on a workpiece, particularly as no cumulative error can occur because each recorded positional number represents a definite position and not merely an increment from the preceding position.

It has been assumed in the foregoing that an even-parity digit group is recorded before each of the X, Y and Z blocks of information, but the possibility has been mentioned that an even-parity start group could alternatively be recorded only before the Z block of information in each complete packet. In this latter case, a similar error checking circuit could check the correctness of the information in each complete packet, rather than in each block. In this case also, the digit timing pulse generator DT could be made cyclic in its operation (so that it would go through a complete cycle three times for each packet of information) and a count-of-three counter could be provided which would be stepped on each cycle of generator DT, thereby in effect to label the particular block of information for which the generator DT is currently cycling. This counter could therefore control all the functions which require to be controlled selectively for the X, Y and Z blocks of information.

In the foregoing description of an embodiment of the invention, no details have been given of certain circuits, especially gating and delay circuits, which can take various well-known forms. It may be mentioned however, that combining "OR" gates can be simple rectifier gates and that coincidence gates can be simple resistance-rectifier gates followed if necessary by current amplifying transistor circuits. The inhibiting gates G$h$1 ... G$h$4 (FIG. 6) can be constituted by ferrite cores having an inhibiting winding: these cores would be driven by pulses from the appropriate ones of leads $p$, $q$ and $r$ from the central control circuit. The delay circuits DL1–DL12 in the central control circuit (FIG. 5) for which core driving pulses are not available, could be transistor circuits generally similar to that shown in FIG. 4, the pulse $r$ of the output waveform, delayed with respect to an initiating input pulse, being used as the effective output, shaped and reversed in polarity as may be required. The other delay circuits may each be constituted by a ferrite core, or a series of such cores, driven by pulses from leads $p$, $q$, $r$, $pp$, $qq$, $rr$ selected according to the delay required. In this connection it will be recalled that core 22 in the coding element CD in FIG. 9 constitutes a delay circuit giving a delay of one digit period. Delay circuits additional to those shown may be inserted wherever they may be required to satisfy timing requirements.

Wha I claim is:

1. In a programmed control system for controlling a machine tool in at least two directions of movement in dependence on recorded digital program data which comprises in respect to each said direction a sequence of digital position numbers representing in binary notation to a given scale and with reference to some arbitrary zero a succession of instantaneous positions spaced along the relevant directions:

digital data recording means on which said sequences of numbers relating to the respective directions of movement are recorded in a mutually interlaced manner;

means for reading said recorded sequences of numbers;

common processing equipment for said sequences of numbers as read, said equipment being connected to the reading means for receiving the read sequences of numbers therefrom and processing them preparatory to use;

and means for applying the processed sequences of numbers individually for controlling the movements of the machine tool in the relevant directions.

2. A machine tool control system as claimed in claim 1 in which on said data recording means are also recorded digital tool-size correction factors which respectively precede, as recorded, the position numbers of each sequence thereof that relates to a direction of movement for which such correction is required, and the processing equipment includes a multiplier for producing a digital output that is the arithmetic product of such correction factor and a quantity set into the multiplier according to any divergence of the tool size from a nominal value, together with a combining unit for algebraically adding, according to the sense of correction required, the digital output of the multiplier and the digital position number following said correction factor as recorded.

3. A machine tool control system as claimed in claim 1 in which on the data recording means are also recorded sets of instruction digits interlaced with the position numbers and said processing equipment includes means for separating said instruction digits, as read, from the sequences of the position numbers as read.

4. A machine tool control system as claimed in claim 1 in which on the data recording means the digits constituting the recorded digital data are recorded as serially recorded data digit groups in each of which the digits are recorded in parallel mode, said data recording means having a plurality of recording tracks corresponding in number to the number of digits per group.

5. A machine tool control system as claimed in claim 4 in which the data recording means has a further recording track in which are recorded along with the data digit groups respective parity digits by which the data digit groups are all brought to the same parity.

6. A machine tool control system as claimed in claim 1 in which:

said data recording means has recorded thereon successive packets of digital data;

each such packet comprises successive blocks of recorded digits pertaining respectively to the different directions of movement and each including a positional number from the sequence thereof pertaining to the relevant direction;

the numbers constituting each sequence are recorded in successive packets so that the several sequences are recorded in said mutually interlaced manner;

the digits in each block of digits are recorded as serially recorded groups of data digits, each group having its constituent digits recorded in parallel mode along with a parity digit by which all groups are brought to the same parity;

at least each recorded packet of data is preceded by a recorded start digit group of opposite parity;

and the processing equipment includes means for deriving exclusively from such start group as read, by virtue of its different parity, a start signal for causing resetting of the processing equipment to a starting condition preparatory to processing the digital data in the following packet of information.

7. A machine tool control system as claimed in claim 6 in which each block of digits is preceded by a start digit group of opposite parity, whereby said means for deriving a start signal from such start digit group causes resetting of the processing equipment preparatory to processing the digital data in the following block.

8. A machine tool control system as claimed in claim 7 wherein each start digit group comprises a distinctive combination of digits according to the direction of movement to which the following block of digits relates, and the processing equipment has associated therewith means responsive to said distinctive combinations for controlling, according to the direction of movement to which each block relates, the processing of the digital data in the block and the application of the processed data for controlling the movement in that direction.

9. A machine tool control system as claimed in claim 6 wherein the data digit groups are brought to odd parity and the processing equipment includes means responsive to the reading of such odd parity groups for producing timing clock pulses, and a serialiser initiated into operation by each such clock pulse to present the digits of such groups to the processing equipment in serial form.

10. A machine tool control system as claimed in claim 9 including a shift register in the serialiser connected to receive the digits of each data digit group in parallel and means responsive to each said clock pulse for initiating the generation of a succession of pulses terminating before the next clock pulse, the register being connected to receive said succession of pulses as shift pulses for shifting out the registered digits in serial mode.

11. A machine tool control system as claimed in claim 6 wherein the data groups are brought to odd parity and the processing equipment includes means responsive to the reading of each such odd parity group for producing a timing clock pulse, a circuit effective to count the number of such pulses produced before the next start signal derived from a start group of opposite parity, said counting circuit producing an end signal coincident with said next start signal if the number of clock pulses correctly equals the number of data digit groups before such start group, means for detecting such coincidence, and a monostable circuit initially set to its unstable condition and set towards this condition in response to the detection of such coincidence, said monostable circuit producing a fault signal if permitted to return to its stable condition.

12. A machine tool control system as claimed in claim 6 in which said data recording means has also recorded thereon digital tool-size correction factors included in the blocks of digits which pertain to those directions of movement for which such correction is required, each said factor preceding the recorded positional number in the relevant block of digits, and the processing equipment also including a multiplier for producing a digital output that is the arithmetic product of such correction factor and a quantity set into the multiplier according to any divergence of the tool size from a nominal value, together with a combining unit for algebraically adding, according to the sense of correction required, the digital output of the multiplier and the digital position number following said correction factor as recorded.

References Cited in the file of this patent
UNITED STATES PATENTS 2,883,110    Spencer et al. _____ Apr. 21, 1959
2,917,693    Cail _____ Dec. 15, 1959